United States Patent
Shih et al.

(10) Patent No.: US 11,809,946 B1
(45) Date of Patent: Nov. 7, 2023

(54) DATA COLLECTION FOR BARCODE-READING DEVICES

(71) Applicant: The Code Corporation, Murray, UT (US)

(72) Inventors: Juihsiang Ray Shih, Shrewsbury, MA (US); Ming Lei, Concord, MA (US); Ryan Wayne Hoobler, Cottonwood Heights, UT (US)

(73) Assignee: The Code Corporation, Murray, UT (US)

( * ) Notice: Subject to any disclaimer, the term of this patent is extended or adjusted under 35 U.S.C. 154(b) by 77 days.

(21) Appl. No.: 17/732,077

(22) Filed: Apr. 28, 2022

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
CPC .......................... G06K 7/10722; G06K 7/1413

USPC ...................................................... 235/462.41
See application file for complete search history.

(56) References Cited

U.S. PATENT DOCUMENTS

| | | | |
|---|---|---|---|
| 7,392,951 B2 | 7/2008 | Ray et al. | |
| 8,276,821 B2 | 10/2012 | He | |
| 8,944,332 B2 | 2/2015 | Harding et al. | |
| 10,699,085 B2 | 6/2020 | Utykanshi et al. | |
| 11,076,021 B2 | 7/2021 | Ashby et al. | |
| 2022/0374443 A1 * | 11/2022 | Fan ....................... | G06F 16/254 |

* cited by examiner

*Primary Examiner* — Toan C Ly
(74) *Attorney, Agent, or Firm* — Thomas M. Hardman

(57) ABSTRACT

Data can be collected from a plurality of barcode-reading devices associated with an enterprise. The collected data can be distinct from the decoded data that is generated by the barcode-reading devices when barcodes are read. For example, the collected data can include device data describing one or more characteristics of the barcode-reading device. Other types of data (e.g., camera data, license data, decoding metadata) can also be collected. The collected data can be sent to a remote server for processing and analysis. The remote server can provide feedback to the enterprise based on the results of analyzing the collected data.

20 Claims, 10 Drawing Sheets

DATA COLLECTION FOR BARCODE-READING DEVICES

CROSS-REFERENCE TO RELATED APPLICATIONS

N/A

BACKGROUND

The present disclosure is generally related to barcodes and barcode-reading devices. The term "barcode" refers to an optical machine-readable representation of information. The term "barcode-reading device" refers to any device that is capable of identifying or extracting information from barcodes.

An image-based barcode-reading device includes a camera for capturing an image of a barcode to be read. The camera includes a focusing lens that focuses light reflected from a target area onto a photosensor array. Once an image of a barcode has been captured by the camera, a decoder processes the image and extracts the information contained in the barcode. An image-based barcode-reading device may be a standalone device (commonly referred to as a barcode reader or a barcode scanner), or it may be a mobile computing device (e.g., a smartphone or tablet computer) that includes a camera and software for reading barcodes.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

The systems and methods disclosed herein are generally related to improving the operation of barcode-reading devices. In accordance with the present disclosure, data can be collected from a plurality of barcode-reading devices associated with an enterprise. The collected data can be distinct from the decoded data that is generated by the barcode-reading devices when barcodes are read. For example, the collected data can include device data describing one or more characteristics of the barcode-reading device. Other types of data (e.g., camera data, license data, decoding metadata) can also be collected. The collected data can be sent to a remote server for processing and analysis. The remote server can provide feedback to the enterprise based on the results of analyzing the collected data.

Some embodiments of the present disclosure as related to a scenario in which a license key is required to enable one or more features of the decoder on the barcode-reading devices. The license key can include a data collection policy. Data collection can be activated or deactivated based at least in part on the data collection policy. The data collection policy can also specify which data should be collected and when the data should be collected.

In some embodiments, the collected data can be used to determine information related to decoder licenses. For example, consider a scenario in which the owner of the decoder issues a single license key for a particular enterprise, such that the same license key is used by all of the enterprise's users. In this scenario, the collected data can be used to count how many different barcode-reading devices have used the enterprise's license key during a particular time period. For example, the number of unique device fingerprints within the portion of the collected data that is associated with the enterprise and with the particular time period can be counted.

The collected data can be used to determine other types of information as well. For example, the collected data can be used to determine barcode quality information. The barcode quality information that is determined in relation to a barcode-reading device can indicate the quality of the printed barcodes that are being read by the barcode-reading device. Feedback about the barcode quality information can then be provided to the enterprise.

As another example, the collected data can be used to determine device effectiveness information. The device effectiveness information that is determined in relation to a barcode-reading device can indicate how effectively that barcode-reading device is being used to read barcodes. Feedback about the device effectiveness information can then be provided to the enterprise.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

FIGS. 1A through 1D illustrate an example of a system 100 in which the techniques disclosed herein can be utilized.

Figure 1A:
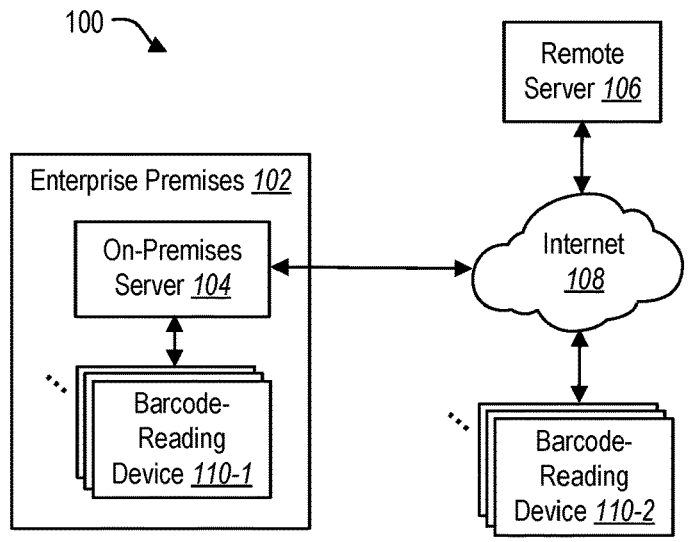
FIG. 1A illustrates an example of a system in which the techniques disclosed herein can be utilized.

Reference is initially made to FIG. 1A, which shows a plurality of barcode-reading devices 110-1, 110-2. The barcode-reading devices 110-1, 110-2 may include standalone barcode scanners and/or mobile devices that include software for reading barcodes. For purposes of the present discussion, it will be assumed that the plurality of barcode-reading devices 110-1, 110-2 are associated with an enterprise. Some of the barcode-reading devices 110-1 are located at the enterprise premises 102, and some of the barcode-reading devices 110-2 are located off premises (i.e., located someplace other than the enterprise premises 102).

The barcode-reading devices 110-1, 110-2 are each configured to collect data and send the data to a remote server 106. At least some of the barcode-reading devices 110-1 that are located at the enterprise premises 102 may send the data to the remote server 106 via an on-premises server 104. The barcode-reading devices 110-2 that are located off premises may send the data to the remote server 106 via a connection to the Internet 108.

Figure 1B:
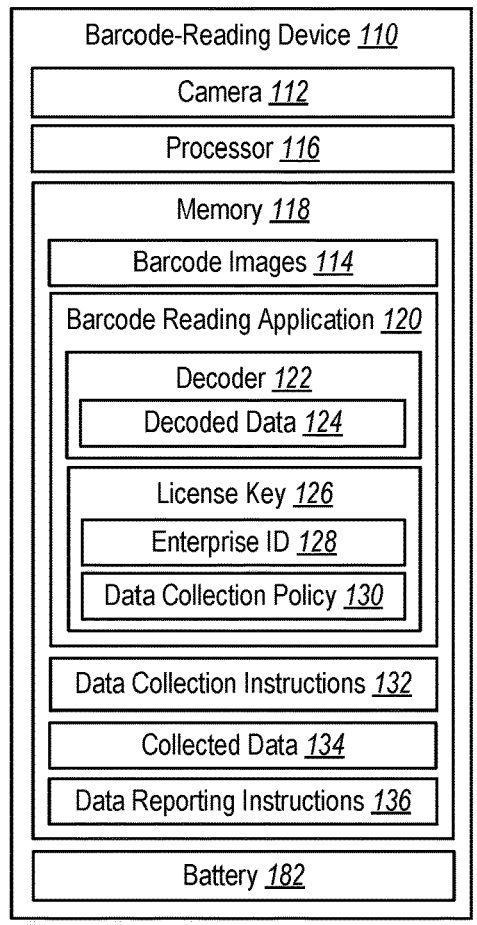
FIG. 1B illustrates an example of a barcode-reading device that can be utilized in the system shown in FIG. 1A.

FIG. 1B illustrates an example of a barcode-reading device 110. Each of the barcode-reading devices 110-1, 110-2 shown in FIG. 1A can be configured similarly to the barcode-reading device 110 shown in FIG. 1B. More specifically, each of the barcode-reading devices 110-1, 110-2 shown in FIG. 1A can include the components of the barcode-reading device 110 shown in FIG. 1B.

The barcode-reading device 110 includes a camera 112 that is configured to capture barcode images 114. The barcode-reading device 110 also includes a processor 116 and memory 118 that is communicatively coupled to the processor 116.

The memory 118 includes a barcode reading application 120. The barcode reading application 120 is configured to facilitate the reading of barcodes. The barcode reading application 120 includes a decoder 122. The decoder 122 is configured to decode the barcode images 114 captured by the camera 112 and generate decoded data 124.

The memory 118 also includes various instructions that are executable by the processor 116, including data collection instructions 132 and data reporting instructions 136. The data collection instructions 132 are executable by the processor 116 to collect data 134 that is related to the operation of the barcode-reading device 110. Such data 134 may sometimes be referred to herein as collected data 134.

The data reporting instructions 136 are executable by the processor 116 to send the collected data 134 to the remote server 106.

The barcode-reading devices 110-1 that are located at the enterprise premises 102 may be configured to send the collected data 134 to the remote server 106 via the on-premises server 104. Alternatively, or in addition, the barcode-reading devices 110-1 that are located at the enterprise premises 102 may be configured to send the collected data 134 to the remote server 106 via a connection to the Internet 108.

A wide variety of data may be collected and reported to the remote server 106. This will be described in greater detail below in connection with FIG. 1C.

In some embodiments, the collected data 134 does not include the decoded data 124. In other words, the decoded data 124 is not sent to the remote server 106. However, the collected data 134 may include metadata about the decoded data 124, as will be described in greater detail below. The metadata can describe the decoded data 124. However, the metadata does not include the decoded data 124.

In some embodiments, a license key 126 is needed to enable one or more features of the decoder 122. For example, the decoder 122 may be disabled or limited to certain features or modes without access to the license key 126. The license key 126 can enable the decoder 122 or enable additional features or modes of the decoder 122 beyond the features or modes that would otherwise be available.

The license key 126 can include an enterprise ID 128. The barcode-reading device 110 can be associated with an enterprise (e.g., purchased by the enterprise for use by individuals who are employed by or otherwise associated with the enterprise), and the enterprise ID 128 can uniquely identify that enterprise.

The license key 126 can include a data collection policy 130. The data collection policy 130 can define whether or not data collection takes place. For example, the data collection policy 130 can indicate whether data collection should be activated or deactivated. In addition, the data collection policy 130 can specify which data 134 should be collected and when the data 134 should be collected.

The data collection instructions 132 can be executable by the processor 116 to activate or deactivate data collection based at least in part on the data collection policy 130. More specifically, the data collection instructions 132 can be executable by the processor 116 so that (a) if the data collection policy 130 indicates that data collection should be activated, then the data 134 is collected and reported to the remote server 106 as described herein, and (b) if the data collection policy 130 indicates that data collection should be deactivated, then the data 134 is not collected or reported to the remote server 106.

Figure 1C:
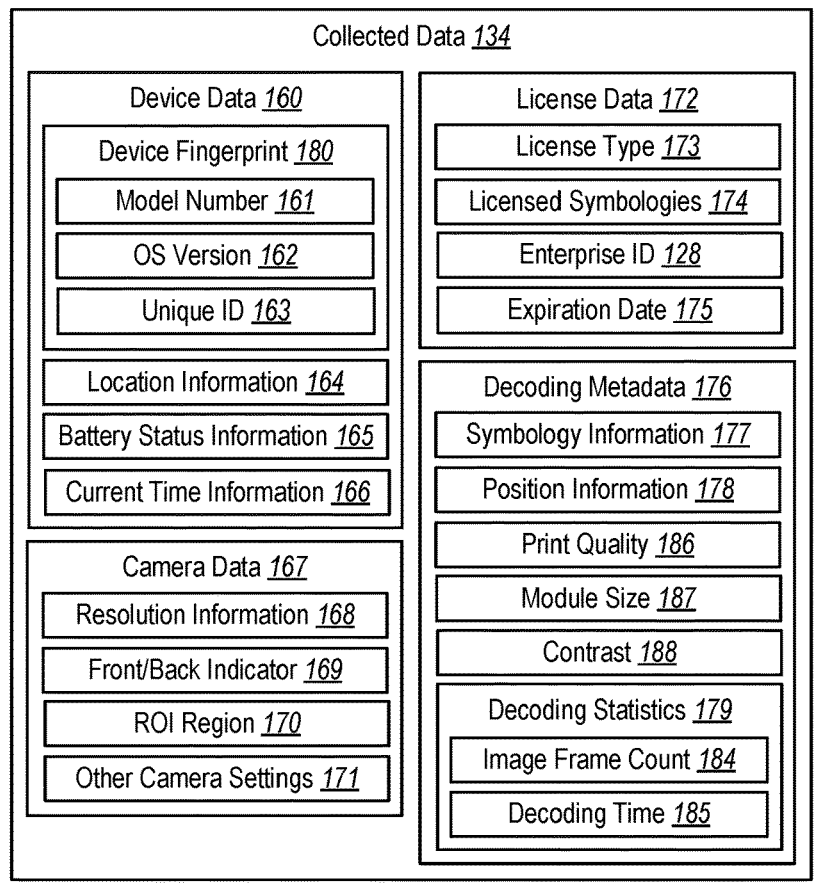
FIG. 1C illustrates an example of data that can be collected and reported to a remote server in accordance with the techniques disclosed herein.

FIG. 1C illustrates an example of the data 134 that can be collected and reported to the remote server 106. The data 134 that is collected for a particular barcode-reading device 110 can include device data 160, camera data 167, license data 172, and decoding metadata 176.

The device data 160 that is collected for a particular barcode-reading device 110 can describe one or more characteristics of the barcode-reading device 110. The device data 160 that is collected for a particular barcode-reading device 110 can include a model number 161 corresponding to the barcode-reading device 110. The device data 160 that is collected for a particular barcode-reading device 110 can also include an operating system version 162 that indicates the version of the operating system that is running on the barcode-reading device 110. The device data 160 that is collected for a particular barcode-reading device 110 can also include a unique ID 163 that uniquely identifies the barcode-reading device 110. The unique ID 163 may be, for example, a processor ID, a MAC address, a UUID, or the like. The device data 160 that is collected for a particular barcode-reading device 110 can also include location information 164 identifying a location of the barcode-reading device 110. The location information 164 can be obtained from a GPS receiver that is included within the barcode-reading device 110. The device data 160 that is collected for a particular barcode-reading device 110 can also include battery status information 165. The battery status information 165 can indicate to what extent a battery within the barcode-reading device 110 is charged. The device data 160 that is collected for a particular barcode-reading device 110 can also include current time information 166. In some embodiments, the current time information 166 can indicate the current time when the barcode-reading device 110 sends the device data 160 to the remote server 106. Alternatively, or in addition, the current time information 166 can indicate the current time when the device data 160 is received by the remote server 106.

At least some of the device data 160 may be considered to be a device fingerprint 180. For example, in the depicted embodiment, the device fingerprint 180 includes the model number 161, the operating system version 162, and the unique ID 163. In other embodiments, a device fingerprint may include other information in addition to or in place of the information shown in FIG. 1C. Some examples of the way that a device fingerprint 180 can be used in accordance with the techniques disclosed herein will be discussed below.

The camera data 167 that is collected for a particular barcode-reading device 110 can describe one or more characteristics of the camera 112 that is included in the barcode-reading device 110. The camera data 167 that is collected for a particular barcode-reading device 110 can include resolution information 168. The resolution information 168 can indicate the resolution of the barcode images 114 that are captured by the camera 112. The camera data 167 that is collected for a particular barcode-reading device 110 can also include a front/back indicator 169. If the barcode-reading device 110 includes both a front camera and a back camera, the front/back indicator 169 can indicate which of these cameras is being used to capture the barcode images 114. The camera data 167 that is collected for a particular barcode-reading device 110 can also include a region of interest (ROI) region 170. The ROI region 170 can refer to a region within an image where a barcode is expected to be located. The camera data 167 that is collected for a particular barcode-reading device 110 can also include other camera settings 171. The other camera settings 171 can include information about the ISO setting that is being used, the zoom level that is being used, the camera APIs that have been called, and so forth.

The license data 172 that is collected for a particular barcode-reading device 110 can describe one or more characteristics of the license key 126 for the decoder 122. The license data 172 that is collected for a particular barcode-reading device 110 can include a license type 173. In embodiments where there are potentially a plurality of different types of licenses that could be granted in connection with the decoder 122, the license type 173 can indicate which type of license has been issued. The license data 172 that is collected for a particular barcode-reading device 110 can also include licensed symbologies 174. In embodiments where the decoder 122 can potentially decode a plurality of different symbologies, the licensed symbologies 174 can indicate which of these symbologies the decoder 122 has been licensed to decode. The license data 172 that is collected for a particular barcode-reading device 110 can also include the enterprise ID 128. As noted above, the enterprise ID 128 can uniquely identify the enterprise that the barcode-reading device 110 is associated with. The license data 172 that is collected for a particular barcode-reading device 110 can also include an expiration date 175. The expiration date 175 can indicate when the license key 126 expires.

In some embodiments, the data 134 that is collected for a particular barcode-reading device 110 can also include decoding metadata 176. The decoding metadata 176 can describe one or more characteristics of the decoded data 124. However, the decoding metadata 176 does not include any of the decoded data 124. As discussed above, the system 100 can be structured so that the decoded data 124 is not sent to the remote server 106. The decoding metadata 176 does not include any of the decoded data 124. Instead, the decoding metadata 176 includes other information that describes the decoded data 124.

The decoding metadata 176 that is collected for a particular barcode-reading device 110 can include symbology information 177. The symbology information 177 can indicate the symbology of the barcodes that were decoded in order to generate the decoded data 124.

The decoding metadata 176 that is collected for a particular barcode-reading device 110 can also include position information 178. Where a barcode is successfully decoded to generate decoded data 124, the position information 178 can indicate where in the barcode image 114 the barcode was located.

The decoding metadata 176 that is collected for a particular barcode-reading device 110 can also include print quality 186. The print quality 186 can be a metric that indicates a level of quality associated with a printed barcode.

The decoding metadata 176 that is collected for a particular barcode-reading device 110 can also include module size 187. The module size 187 can be a metric that indicates the size of individual barcode modules within a printed barcode. In this context, the term "barcode module" can refer to a unit or element of a barcode, such as a square, bar, etc. In some embodiments, the module size 187 can indicate the size of the smallest barcode modules within a printed barcode.

The decoding metadata 176 that is collected for a particular barcode-reading device 110 can also include contrast 188. The contrast 188 can be a metric that indicates a level of contrast associated with a printed barcode.

The decoding metadata 176 that is collected for a particular barcode-reading device 110 can also include decoding statistics 179. There are many different types of statistics that can be included within the decoding statistics 179. For example, where a barcode is successfully decoded to generate decoded data 124, the decoding statistics 179 can include an image frame count 184 and a decoding time 185. The image frame count 184 can indicate the number of image frames that were required to be captured in order to successfully decode the barcode. The decoding time 185 can indicate how long it took to decode the barcode.

In some embodiments, some or all of the decoding metadata 176 can be average values determined by a barcode-reading device 110. For example, a barcode-reading device 110 can do some processing to determine an average value for the print quality 186 over a particular time period, and this average value can be reported to the remote server 106. A barcode-reading device 110 can also determine and report average values for any of the other metrics shown in the decoding metadata 176, including decoding statistics 179 such as the image frame count 184 and/or the decoding time 185. In some embodiments, the average value that is determined and reported to the remote server 106 by a particular barcode-reading device 110 for a particular metric can represent an average of all of the values for that particular metric since the previous time that data was collected for the barcode-reading device 110.

The collected data 134 shown in FIG. 1C is provided for purposes of example only and should not be interpreted as limiting the scope of the present disclosure. It is not necessary for all of the data 134 shown in FIG. 1C to be collected. In some embodiments, only some of the data 134 shown in FIG. 1C may be collected. In other embodiments, additional data not shown in FIG. 1C may also be collected using the techniques disclosed herein.

As noted above, the data collection policy 130 on a particular barcode-reading device 110 can specify which data should be collected for the barcode-reading device 110. There are many different ways that a data collection policy 130 could be structured. As one example, a data collection policy 130 could indicate that all available data (e.g., all of the collected data 134 shown in FIG. 1C) should be collected. As another example, a data collection policy 130 could indicate that some, but not all, of the available data should be collected. For instance, a data collection policy 130 could indicate that device data 160 and decoding metadata 176 should be collected, but camera data 167 and license data 172 should not be collected. As another example, a data collection policy 130 could indicate that data collection should not take place at all.

Figure 1D:
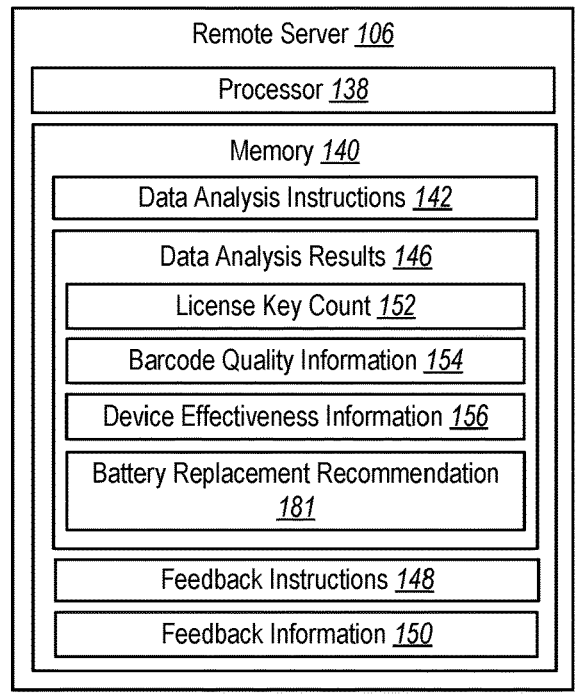
FIG. 1D illustrates an example of a remote server that can be utilized in the system shown in FIG. 1A.

FIG. 1D illustrates an example of the remote server 106. The remote server 106 includes a processor 138 and memory 140 that is communicatively coupled to the processor 138. The memory 140 includes various instructions that are executable by the processor 138, including data analysis instructions 142 and feedback instructions 148.

The data analysis instructions 142 are executable by the processor 138 to analyze the collected data 134 received from the plurality of barcode-reading devices 110-1, 110-2 and generate data analysis results 146. There are many different types of data analysis results 146 that can be generated, depending on the type of analysis that is performed on the collected data 134.

In some embodiments, the data analysis results 146 can include a license key count 152. The license key count 152 can indicate how many different barcode-reading devices 110 associated with the enterprise have used the license key 126 during a particular time period.

There are a variety of reasons why generating a license key count 152 could be useful to an enterprise. One possible scenario in which a license key count 152 could be useful will now be described.

In some embodiments, the owner of the decoder 122 may issue a single license key 126 for a particular enterprise. All of the enterprise's users would then use the same license key 126. However, the owner of the decoder 122 may choose to issue different license keys for different enterprises.

For example, suppose that a license key (referred to as license key A) is issued for enterprise A and that another license key (referred to as license key B) is issued for enterprise B. In this example, all of the barcode-reading devices 110 associated with enterprise A would use license key A, and all of the barcode-reading devices 110 associated with enterprise B would use license key B.

The owner of the decoder 122 may charge the enterprise license fees in exchange for providing the license key 126. The total amount of the license fees charged to the enterprise may be based at least in part on the number of barcode-reading devices 110 on which the license key 126 is used. For example, an enterprise may agree to pay the owner of the decoder 122 a separate license fee for each barcode-reading device 110 on which the license key 126 has been entered to enable additional functionality of the decoder 122.

In a scenario like the one just described, it can be difficult for an enterprise to determine the number of barcode-reading devices 110 on which the license key 126 is used. The techniques disclosed herein can be used to determine the number of barcode-reading devices 110 on which the license key 126 has been used during a particular time period. More specifically, the collected data 134 can be analyzed to determine a license key count 152. The license key count 152 can enable an accurate determination of the total license fees that should be paid by a particular enterprise for the use of the license key 126.

As noted above, generating the license key count 152 for an enterprise can include determining how many unique device fingerprints 180 exist within a subset of the collected data 134. More specifically, generating the license key count 152 for an enterprise can include determining how many unique device fingerprints 180 exist within the portion of the collected data 134 that is associated with the enterprise and with a particular time period (e.g., day, week, month, year). In this context, the term "device fingerprint" can refer to a combination of characteristics about a barcode-reading device 110 that, when considered collectively, uniquely identify the barcode-reading device 110.

As discussed above, a subset of the device data 160 that is collected for a particular barcode-reading device 110 can be used to form a device fingerprint 180. For example, FIG. 1C shows a device fingerprint 180 that includes the model number 161, OS version 162, and unique ID 163.

Figure 2:
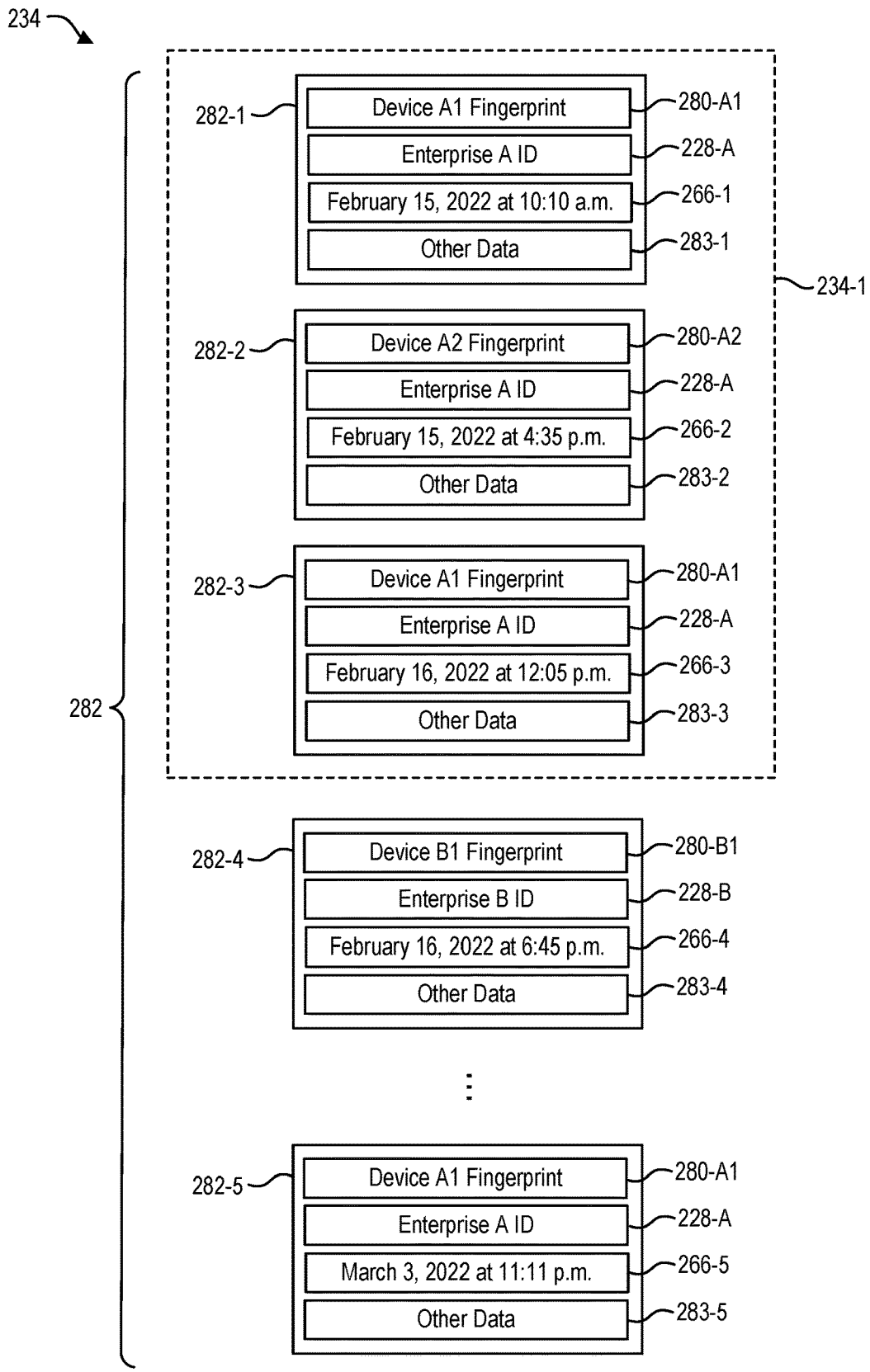
FIG. 2 illustrates another example of data that can be collected and reported to a remote server in accordance with the techniques disclosed herein.
Figure 3:
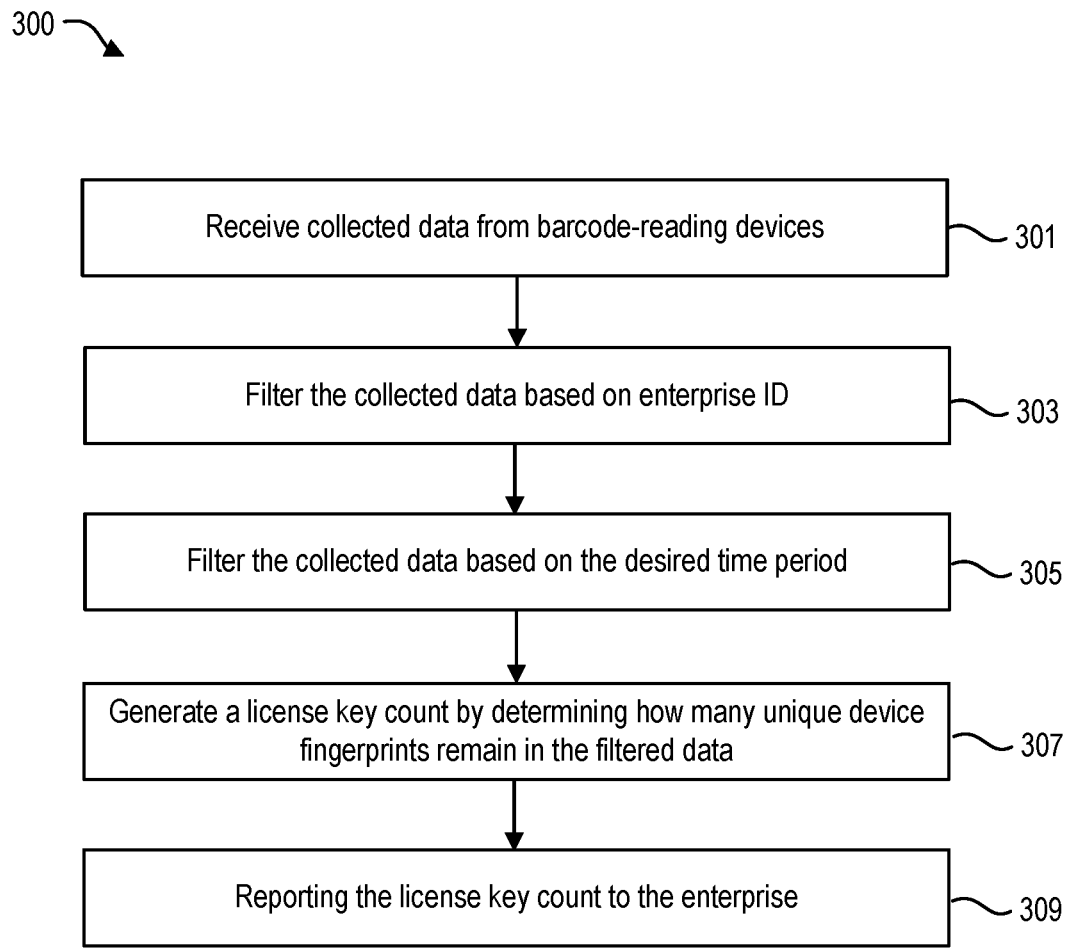
FIG. 3 illustrates an example of a method for generating a license key count for a particular enterprise based on the collected data shown in FIG. 2.

FIGS. 2 and 3 illustrate an example showing how a license key count 152 can be generated based on determining how many unique device fingerprints exist within a subset of collected data. More specifically, an example of some collected data 234 is shown in FIG. 2, and FIG. 3 illustrates a method 300 for generating a license key count 152 for a particular enterprise based on the collected data 234.

The collected data 234 shown in FIG. 2 includes a plurality of data records 282. Each data record 282 is an example of a set of data that a particular barcode-reading device 110 could send to the remote server 106 at a particular point in time. In the depicted example, each data record 282 includes a device fingerprint, an enterprise ID, current time information, and other data. The device fingerprint can be similar to the device fingerprint 180 described previously. The enterprise ID can be similar to the enterprise ID 128 described previously. The current time information can be similar to the current time information 166 described previously. The other data can include some or all of the device data 160, camera data 167, license data 172, and/or decoding metadata 176 described previously.

Data record 282-1 includes device A1 fingerprint 280-A1, which is a device fingerprint 180 for a barcode-reading device 110 that will be referred to as device A1. Data record 282-1 also includes enterprise A ID 228-A, which is an ID for an enterprise that will be referred to as enterprise A. Data record 282-1 also includes a timestamp 266-1 and other data 283-1.

Data record 282-2 includes device A2 fingerprint 280-A2, which is a device fingerprint 180 for a barcode-reading device 110 that will be referred to as device A2. Data record 282-2 also includes enterprise A ID 228-A. Thus, data record 282-1 and data record 282-2 are sent by different barcode-reading devices 110 (namely, device A1 and device A2, respectively) that belong to the same enterprise (namely, enterprise A). Data record 282-2 also includes a timestamp 266-2 and other data 283-2.

Data record 282-3 includes device A1 fingerprint 280-A1 and enterprise A ID 228-A. In other words, data record 282-3 is sent by the same barcode-reading device 110 that sent data record 282-1. Data record 282-3 also includes a timestamp 266-3 and other data 283-3.

Data record 282-4 includes device B1 fingerprint 280-B1, which is a device fingerprint 180 for a barcode-reading device 110 that will be referred to as device B1. Data record 282-4 also includes enterprise B ID 228-B, which is an ID for an enterprise that will be referred to as enterprise B. Thus, the barcode-reading device 110 that sent data record 282-4 (namely, device B1) belongs to a different enterprise than the barcode-reading devices 110 (namely, device A1 and device A2) that sent the previous data records 282-1, 282-2, 282-3. Data record 282-4 also includes a timestamp 266-4 and other data 283-4.

Data record 282-5 includes device A1 fingerprint 280-A1 and enterprise A ID 228-A. In other words, data record 282-5 is sent by the same barcode-reading device 110 (namely, device A1) that sent data record 282-1 and data record 282-3. Data record 282-5 also includes a timestamp 266-5 and other data 283-5.

Reference is now made to FIG. 2 in conjunction with FIG. 3. As noted above, FIG. 3 illustrates a method 300 for generating a license key count 152 for a particular enterprise during a particular time period based on collected data 234. In the present example, it will be assumed that the license key count 152 is being generated for enterprise A. It will also be assumed that the relevant time period is the month of February 2022.

The method 300 can be performed by the remote server 106. In some embodiments, the method 300 can be performed as a consequence of at least some portion of the data analysis instructions 142 and/or the feedback instructions 148 being executed by the processor 138 of the remote server 106.

At 301, the remote server 106 receives the collected data 234 from the barcode-reading devices 110-1, 110-2.

At 303, the remote server 106 filters the collected data 234 based on enterprise ID so that any collected data 234 that does not correspond to the enterprise of interest is excluded from consideration. Thus, in the present example, where enterprise A is the enterprise of interest, this filtering operation excludes any data records 282 that do not include the enterprise A ID 228-A. As a result of this filtering operation, data record 282-4 is excluded from consideration.

At 305, the remote server 106 filters the collected data 234 based on the desired time period so that any collected data 234 that does not correspond to the desired time period is excluded from consideration. Thus, in the present example, where the month of February 2022 is the desired time period, this filtering operation excludes any data records 282 that do not include a timestamp that falls sometime within the month of February 2022. As a result of this filtering operation, data record 282-5 is excluded from consideration.

The portion of the collected data 234 that remains after the above-described filtering operations have been performed may be referred to as filtered data 234-1. This filtered data 234-1 is indicated by the dotted line shown in FIG. 2.

At 307, the remote server 106 generates a license key count 152 by determining how many unique device fingerprints 180 remain in the filtered data 234-1. In the present example, there are two unique device fingerprints 180 (namely, device A1 fingerprint 280-A1 and device A2 fingerprint 280-A2) in the filtered data 234-1. Thus, the license key count 152 in the present example is two. More specifically, in the present example it can be concluded that two different barcode-reading devices 110 have used the license key 126 during the month of February 2022.

At 309, the remote server 106 reports the license key count 152 to the enterprise. For example, the remote server 106 can send (or initiate the sending of) a message that includes the license key count 152 to the enterprise.

For the sake of simplicity and clarity, the example that was just described in connection with FIGS. 2 and 3 only includes a few data records 282 sent by a few barcode-reading devices 110. However, that should not be interpreted as limiting the scope of the present disclosure. Those skilled in the art will appreciate that the techniques disclosed herein can be performed in relation to many more data records 282 sent by many more barcode-reading devices 110.

A license key count 152 is just one example of the different types of data analysis results 146 that can be generated in accordance with the present disclosure. Some additional examples will now be described.

Reference is once again made to FIG. 1D. In some embodiments, the data analysis results 146 can include barcode quality information 154. More specifically, the data analysis instructions 142 can be executable by the processor 138 to analyze the collected data 134 and generate barcode quality information 154.

The barcode quality information 154 that is determined in relation to a particular barcode-reading device 110 can indicate the quality of the printed barcodes that are being read or scanned by that barcode-reading device 110. The quality of the printed barcodes produced by a particular printer can decline over time. There are many reasons why this can occur, such as the printer's toner cartridge needing to be replaced, the printer wearing out, etc. When the quality of printed barcodes decreases significantly, it can become difficult to read the barcodes. In accordance with the techniques disclosed herein, it may be possible to use the collected data 134 to determine when the quality of the printed barcodes being read by a barcode-reading device 110 (or a group of barcode-reading devices 110) has declined.

There are various ways for the remote server 106 to determine the barcode quality information 154. In some embodiments, the barcode quality information 154 can be determined based at least in part on the print quality 186 in the collected data 134 received from barcode-reading devices 110. In other words, the barcode-reading devices 110 can determine print quality 186 and send the print quality 186 to the remote server 106, and the barcode quality information 154 can be based at least in part on the print quality 186 that is received from the barcode-reading devices 110.

In some embodiments, the barcode quality information 154 can be determined based at least in part on an analysis of the decoding statistics 179 in the collected data 134 received from barcode-reading devices 110. In other words, the barcode-reading devices 110 can determine decoding statistics 179 and send the decoding statistics 179 to the remote server 106, and the barcode quality information 154 can be based at least in part on an analysis of the decoding statistics 179 that are received from the barcode-reading devices 110.

In some embodiments, the barcode quality information 154 can be determined based at least in part on both the print quality 186 and the decoding statistics 179. In other words, the barcode-reading devices 110 can determine the print quality 186 and also determine decoding statistics 179, and both print quality 186 and decoding statistics 179 can be sent to the remote server 106 and used by the remote server 106 for purposes of determining barcode quality information 154.

The barcode quality information 154 that is determined by the remote server 106 can be based on collected data 134 (including print quality 186 and/or decoding statistics 179) received from a plurality of different barcode-reading devices 110. For example, if there are a plurality of barcode-reading devices 110 that are being used at a particular enterprise, the remote server 106 can determine and report barcode quality information 154 to the enterprise based on an analysis of the collected data 134 that is received from all (or substantially all) of the barcode-reading devices 110 at the enterprise.

An example will now be described to illustrate how barcode quality information 154 can be determined based on an analysis of the decoding statistics 179 that have been received from one or more barcode-reading devices 110. As noted above, the decoding statistics 179 can include an image frame count 184 and/or decoding time 185. If the quality of the printed barcodes being read by a barcode-reading device 110 is relatively high, then the image frame count 184 and the decoding time 185 would be expected to be relatively low. In other words, it would be expected that high-quality barcodes can be read and decoded fairly quickly, requiring only one or a few image frames to be captured. However, as the quality of the printed barcodes decreases, then the image frame count 184 and the decoding time 185 could increase due to the increased difficulty of reading the printed barcodes.

Once the quality of the printed barcodes has degraded below a certain level, then it may not be possible to read the barcodes at all. Therefore, to determine barcode quality information 154 associated with one or more barcode-reading devices 110, the decoding statistics 179 associated with the barcode-reading device(s) 110 can be monitored over time. If the image frame count 184 and/or the decoding time 185 increase by more than a pre-defined amount, then this can be interpreted as an indication that the quality of the printed barcodes has decreased below an acceptable level. A message can then be sent to the enterprise notifying them about the decreased quality of the printed barcodes. In response to receiving such a message, the enterprise can take appropriate steps to improve the quality of the printed barcodes (e.g., by replacing the toner cartridge and/or replacing the printer itself).

Figure 4:
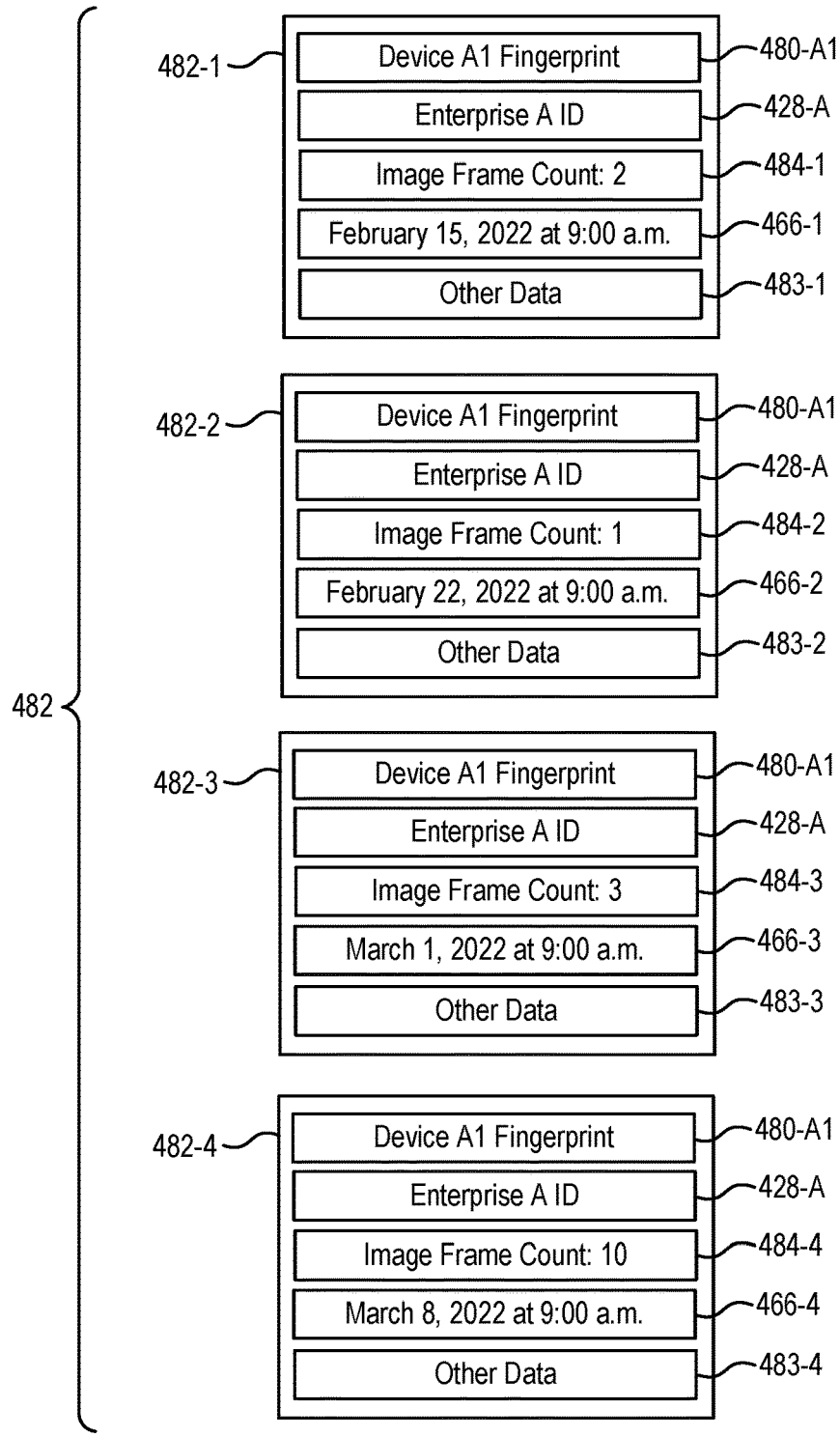
FIG. 4 illustrates another example of data that can be collected and reported to a remote server in accordance with the techniques disclosed herein.
Figure 5:
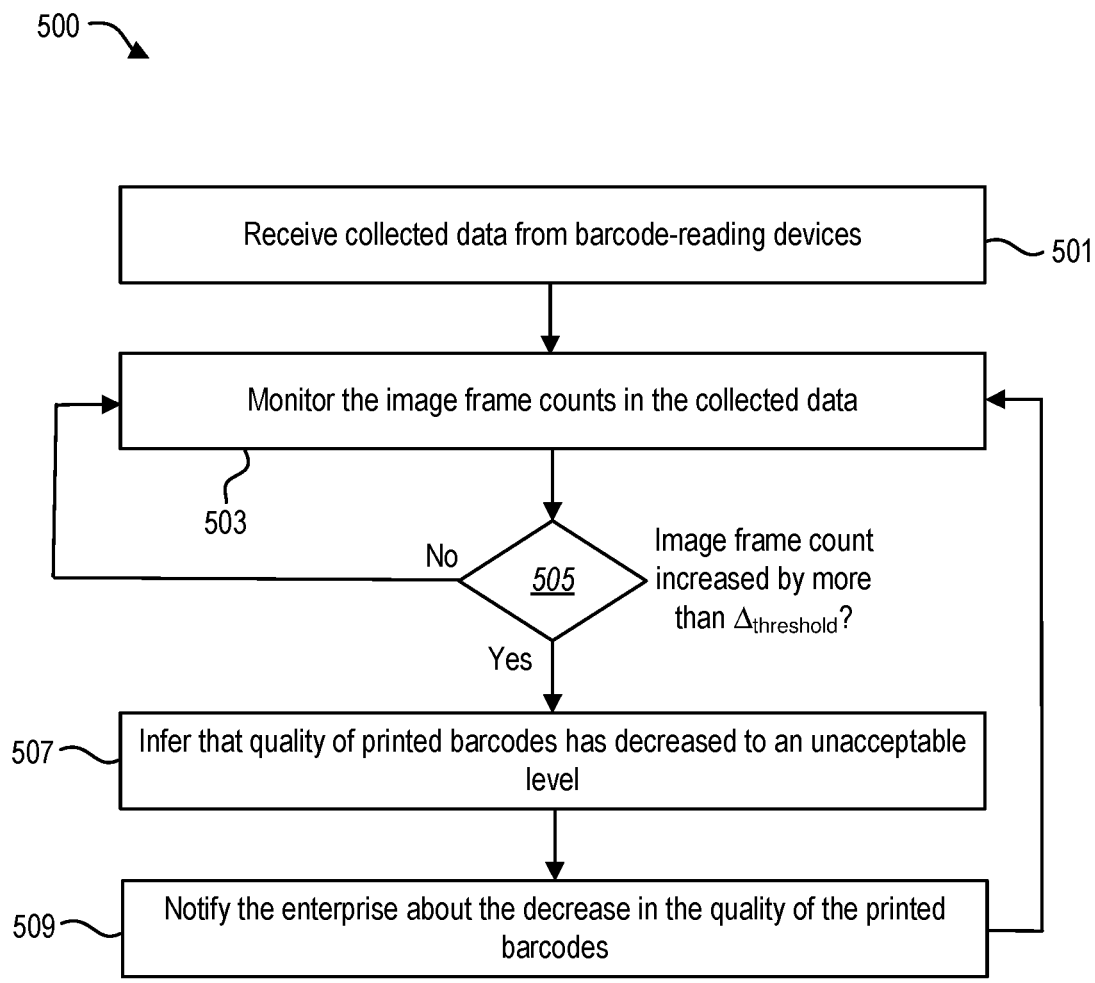
FIG. 5 illustrates a method for determining barcode quality information based on the collected data shown in FIG. 4.

FIGS. 4 and 5 illustrate an example showing how barcode quality information 154 associated with a barcode-reading device 110 can be determined. More specifically, an example of some collected data 434 associated with a barcode-reading device 110 is shown in FIG. 4, and FIG. 5 illustrates a method 500 for determining barcode quality information 154 based on the collected data 434.

The collected data 434 shown in FIG. 4 includes a plurality of data records 482. Each data record 482 corresponds to a set of data that the same barcode-reading device 110 (which will be referred to as device A1) could send to the remote server 106 at a particular point in time. In the depicted example, each data record 482 includes a device fingerprint, an enterprise ID, decoding statistics, and other data. The device fingerprint can be similar to the device fingerprint 180 described previously. The enterprise ID can be similar to the enterprise ID 128 described previously. The decoding statistics can be similar to the decoding statistics 179 described previously. The other data can include some or all of the device data 160, camera data 167, license data 172, and/or decoding metadata 176 described previously.

Data record 482-1 includes device A1 fingerprint 480-A1, enterprise A ID 428-A, image frame count 484-1, timestamp 466-1, and other data 483-1. Data record 482-2 includes device A1 fingerprint 480-A1, enterprise A ID 428-A, image frame count 484-2, timestamp 466-2, and other data 483-2. Data record 482-3 includes device A1 fingerprint 480-A1, enterprise A ID 428-A, image frame count 484-3, timestamp 466-3, and other data 483-3. Data record 482-4 includes device A1 fingerprint 480-A1, enterprise A ID 428-A, image frame count 484-4, timestamp 466-4, and other data 483-4.

As noted above, in some embodiments the image frame count 184 that is reported by a particular barcode-reading device 110 can be an average value (e.g., an average of all of the image frame count values since the previous time that data was collected for that barcode-reading device 110). For example, image frame count 484-2 can represent an average of all of the image frame count values for device A1 since the previous image frame count 484-1 was reported.

Reference is now made to FIG. 5 in conjunction with FIG. 4. As noted above, FIG. 5 illustrates a method 500 for determining barcode quality information 154 based on the collected data 434.

The method 500 can be performed by the remote server 106. In some embodiments, the method 500 can be performed as a consequence of at least some portion of the data analysis instructions 142 and/or the feedback instructions 148 being executed by the processor 138 of the remote server 106.

At 501, the remote server 106 receives the collected data 434 from the barcode-reading devices 110-1, 110-2.

At 503, the remote server 106 monitors the image frame counts 484-1, 484-2, 484-3, 484-4 in the collected data 434. At 505, the remote server 106 determines if any of the image frame counts 484-1, 484-2, 484-3, 484-4 have increased by more than a defined threshold value relative to a previously collected value. This defined threshold value may be referred to herein as a change threshold. The change threshold may be represented symbolically as $\Delta_{threshold}$.

For purposes of the present example, suppose that $\Delta_{threshold}$=5 image frames. Of course, this specific value is being provided for illustration purposes only and should not be interpreted as limiting the scope of the present disclosure.

In data records 482-1, 482-2, 482-3, the image frame counts 484-1, 484-2, 484-3 are fairly close values. The difference between these image frame counts 484-1, 484-2, 484-3 does not change by more than $\Delta_{threshold}$. However, the image frame count 484-4 in data record 482-4 is significantly greater than the image frame counts 484-1, 484-2, 484-3 in data records 482-1, 482-2, 482-3. The difference between the image frame count 484-4 in data record 482-4 and the image frame count 484-3 in data record 482-3 is greater than $\Delta_{threshold}$. This suggests that there has been a significant degradation in the quality of the printed barcodes that are being read by device A1.

At 505, the remote server 106 determines whether the difference between the image frame count 484-4 in data record 482-4 and the image frame count 484-3 in data record 482-3 is greater than $\Delta_{threshold}$.

At 507, in response to determining that the difference between the image frame count 484-4 in data record 482-4 and the image frame count 484-3 in data record 482-3 is greater than $\Delta_{threshold}$, the remote server 106 can infer that the quality of printed barcodes has decreased to an unacceptable level. Then, at 509, the remote server 106 can notify the enterprise about the decrease in the quality of printed barcodes. For example, the remote server 106 can send (or initiate the sending of) a message to the enterprise that includes an indication that the quality of printed barcodes has decreased to an unacceptable level.

Reference is once again made to FIG. 1D, so that another example of data analysis results 146 can be described. In some embodiments, the data analysis results 146 can include device effectiveness information 156. More specifically, the data analysis instructions 142 can be executable by the processor 138 to analyze the collected data 134 and generate device effectiveness information 156.

The device effectiveness information 156 that is determined in relation to a particular barcode-reading device 110 can indicate how effectively that barcode-reading device 110 is being used to read barcodes. For example, suppose that the decoding statistics 179 (e.g., image frame count 184, decoding time 185) associated with a particular barcode-reading device 110 are significantly worse than the decoding statistics 179 associated with other similar barcode-reading devices 110. In this scenario, it can be inferred that the barcode-reading device 110 that has the significantly worse decoding statistics 179 is not being used properly (e.g., it is being held too close or too far away from the barcodes that are being read) or that it has a hardware problem such as a dirty window.

Once a determination has been made that one or more barcode-reading devices 110 are not being used effectively, then the enterprise can be notified about this (e.g., by sending a message to the enterprise). In response to receiving such a notification, the enterprise can take appropriate steps to improve how effectively the barcode-reading device(s) 110 are used. This can include providing training to the relevant user(s)) and/or addressing any hardware problem(s) (e.g., cleaning the window).

Figure 6:
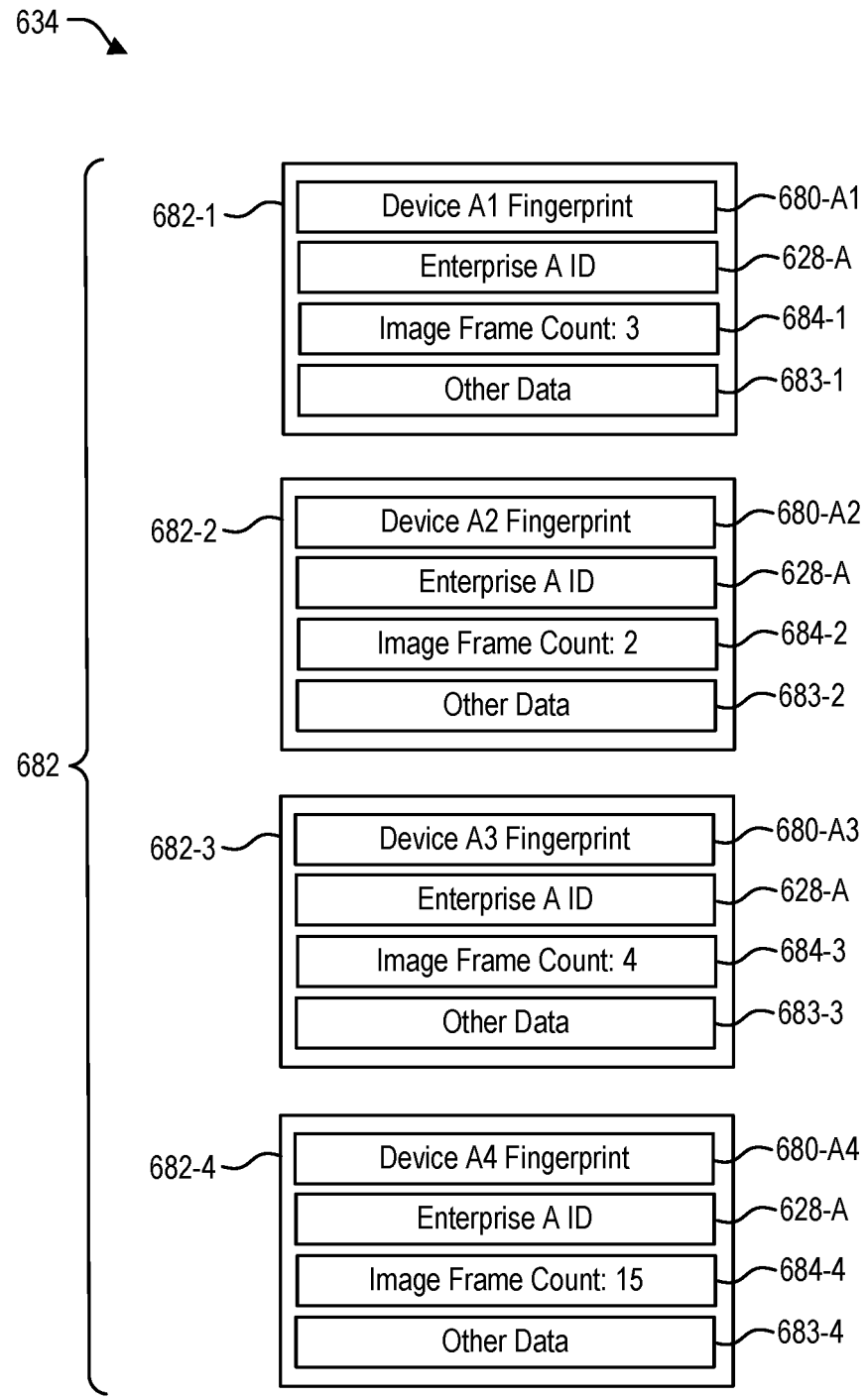
FIG. 6 illustrates another example of data that can be collected and reported to a remote server in accordance with the techniques disclosed herein.
Figure 7:
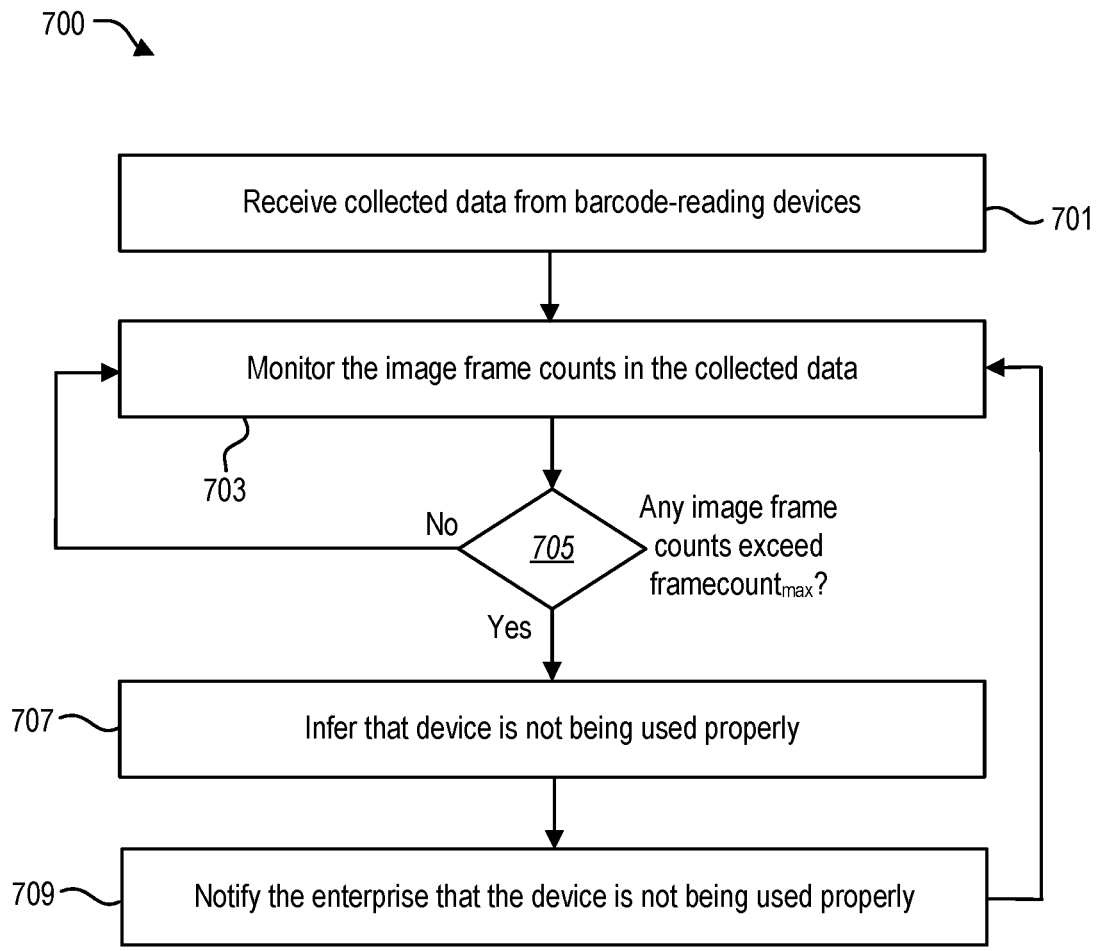
FIG. 7 illustrates a method for determining device effectiveness information based on the collected data shown in FIG. 6.

FIGS. 6 and 7 illustrate an example showing how device effectiveness information 156 associated with a barcode-reading device 110 can be determined. More specifically, an example of some collected data 634 associated with a barcode-reading device 110 is shown in FIG. 6, and FIG. 7 illustrates a method 700 for determining device effectiveness information 156 based on the collected data 634.

The collected data 634 shown in FIG. 6 includes a plurality of data records 682. Each data record 682 corresponds to a set of data that a particular barcode-reading device 110 could send to the remote server 106 at a particular point in time. In the depicted example, each data record 682 includes a device fingerprint, an enterprise ID, image frame count, and other data. The device fingerprint can be similar to the device fingerprint 180 described previously. The enterprise ID can be similar to the enterprise ID 128 described previously. The image frame count can be similar to the image frame count 184 described previously. The other data can include some or all of the device data 160, camera data 167, license data 172, and/or decoding metadata 176 described previously.

In the depicted example, the collected data 634 includes data from four barcode-reading devices 110 associated with the same enterprise. The enterprise will be referred to as enterprise A, and the four barcode-reading devices 110 will be referred to as device A1, device A2, device A3, and device A4.

Data record 682-1 includes device A1 fingerprint 680-A1, enterprise A ID 628-A, image frame count 684-1, and other data 683-1. Data record 682-2 includes device A2 fingerprint 680-A2, enterprise A ID 628-A, image frame count 684-2, and other data 683-2. Data record 682-3 includes device A3 fingerprint 680-A3, enterprise A ID 628-A, image frame count 684-3, and other data 683-3. Data record 682-4 includes device A4 fingerprint 680-A4, enterprise A ID 628-A, image frame count 684-4, and other data 683-4.

In the depicted example, the image frame count 684-4 associated with device A4 is significantly higher than the image frame counts 684-1, 684-2, 684-3 associated with the other devices. This can be interpreted as an indication that device A4 is not being used as effectively as the other devices (e.g., device A4 is not being used properly and/or device A4 has a hardware issue).

Reference is now made to FIG. 7 in conjunction with FIG. 6. As noted above, FIG. 7 illustrates a method 700 for determining device effectiveness information 156 based on the collected data 634.

The method 700 can be performed by the remote server 106. In some embodiments, the method 700 can be performed as a consequence of at least some portion of the data analysis instructions 142 and/or the feedback instructions 148 being executed by the processor 138 of the remote server 106.

At 701, the remote server 106 receives the collected data 634 from the barcode-reading devices 110-1, 110-2.

At 703, the remote server 106 monitors the image frame counts 684-1, 684-2, 684-3, 684-4 in the collected data 634.

At 705, the remote server 106 determines whether any of the image frame counts 684-1, 684-2, 684-3, 684-4 in the collected data 634 are greater than a pre-defined threshold value. This pre-defined threshold value, which may be referred to herein as framecount$_{max}$, represents a value that is significantly higher than an expected image frame count for a barcode-reading device 110 that is being used effectively. Thus, if any of the image frame counts 684-1, 684-2, 684-3, 684-4 in the collected data 634 are equal to or exceed framecount$_{max}$, this can be interpreted as an indication that the corresponding barcode-reading device 110 is not being used effectively.

For purposes of the present example, suppose that framecount$_{max}$=15 image frames. Of course, this specific value is being provided for illustration purposes only and should not be interpreted as limiting the scope of the present disclosure.

In data records 682-1, 682-2, 682-3, the image frame counts 684-1, 684-2, 684-3 are significantly less than framecount$_{max}$. However, the image frame count 684-4 in data record 682-4 is equal to framecount$_{max}$. This suggests that device A4 is not being used effectively.

At 707, in response to determining that the image frame count 684-4 in data record 682-4 is equal to framecount$_{max}$, the remote server 106 can infer that device A4 is not being used effectively. Then, at 709, the remote server 106 can notify the enterprise that device A4 is not being used effectively. For example, the remote server 106 can send (or initiate the sending of) a message to the enterprise that includes an indication that device A4 is not being used effectively.

In the method 700 shown in FIG. 7, determining the device effectiveness information 156 involves determining whether a decoding statistic 179 (namely, the image frame count 184) is greater than or equal to than a pre-defined maximum value (namely, framecount$_{max}$). Of course, the specific decoding statistic 179 that is used in this method 700 is provided for purposes of example only and should not be interpreted as limiting the scope of the present disclosure.

In alternative embodiments, a different decoding statistic 179 (such as the decoding time 185) could be used to determine the device effectiveness information 156. In some embodiments, a combination of a plurality of different decoding statistics 179 (e.g., both the image frame count 184 and the decoding time 185) could be used to determine the device effectiveness information 156.

Reference is once again made to FIG. 1D, so that another example of data analysis results 146 can be described. In some embodiments, the data analysis results 146 can include a recommendation to replace the battery 182 of at least one barcode-reading device 110. Such a recommendation may be referred to herein as a battery replacement recommendation 181.

The remote server 106 can determine that the battery 182 of a particular barcode-reading device 110 should be replaced based at least in part on the collected data 134 related to the barcode-reading device 110, including the battery status information 165 and the decoding metadata 176.

The determination about whether or not a battery replacement recommendation 181 should be made can depend on how many barcode scans are required to deplete the battery 182 to a certain level. In some embodiments, this determination can be based at least in part on how many barcode scans can be performed during what will be referred to as a depletion interval. The depletion interval can refer to a time period between a first point in time ($t_1$) when a battery 182 is charged at a first level ($L_1$) and a second point in time ($t_2$) when the battery 182 is charged at a second level ($L_2$), where $L_1 > L_2$. For example, $L_1$ could be 100% and $L_2$ could be 50%. As another example, $L_1$ could be 75% and $L_2$ could be 25%.

A specific example will be described in relation to the method 800 shown in FIG. 8. There are three parameters that are relevant to the method 800: $S_{new}$, $S_{measured}$, and $S_{threshold}$.

$S_{new}$ is the number of barcode scans that can be performed during the depletion interval by a barcode-reading device 110 with a new battery 182. In some embodiments, the value of $S_{new}$ can be determined based at least in part on the collected data 134. In some embodiments, $S_{measured}$ can be determined for a plurality of barcode-reading devices 110 that each have a new battery 182, and $S_{new}$ can be set equal to an average of the $S_{measured}$ values. Alternatively, in other embodiments, $S_{new}$ can be set based on data obtained from a manufacturer of the battery 182 and/or a manufacturer of the barcode-reading device 110.

$S_{measured}$ is the actual number of barcode scans that a barcode-reading device 110 has performed during a particular depletion interval. The value of $S_{measured}$ for a particular barcode-reading device 110 can be determined based at least in part on the collected data 134.

$S_{threshold}$ is the minimum number of barcode scans that a healthy battery 182 should be expected to perform during a depletion interval. In some embodiments, the value of $S_{threshold}$ can be set as a percentage of $S_{new}$ (e.g., 30% of $S_{new}$). If the value of $S_{measured}$ drops below $S_{threshold}$, this can be interpreted to mean that the battery 182 should be replaced. Consequently, a battery replacement recommendation 181 can then be made.

Figure 8:
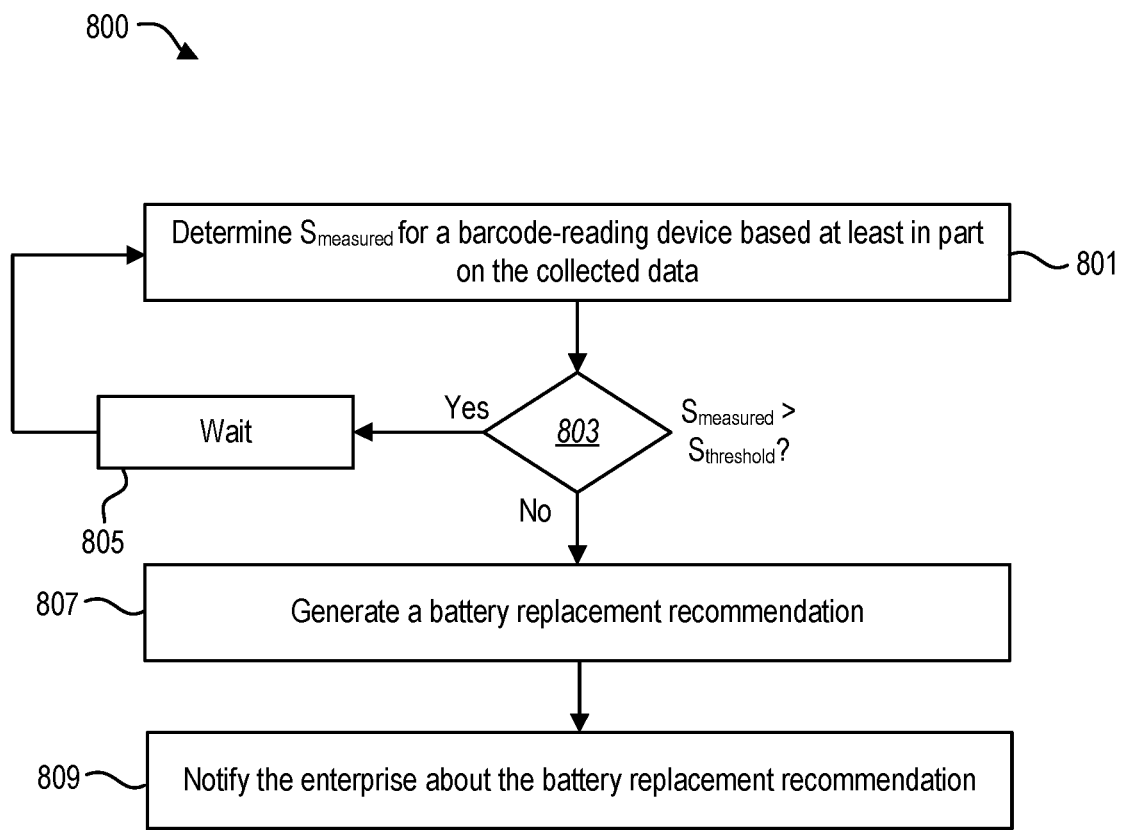
FIG. 8 illustrates a method for determining a battery replacement recommendation.

Reference is now made to the method 800 shown in FIG. 8. At 801, the value of $S_{measured}$ can be determined for a particular barcode-reading device 110. In some embodiments, $S_{measured}$ can be determined based at least in part on the collected data 134. For example, the battery status information 165 and the decoding metadata 176 that have been collected for a barcode-reading device 110 can be used to determine $S_{measured}$ for that barcode-reading device 110 during a particular depletion interval.

At 803, the value of $S_{measured}$ can be compared to $S_{threshold}$. If $S_{measured} > S_{threshold}$, this means that the battery 182 in the barcode-reading device 110 is still healthy. As a result, the battery 182 does not need to be replaced. The method 800 can then involve waiting for some period of time before checking again. More specifically, at 805, the remote server 106 can wait for some period of time (during which additional collected data 134 can be accumulated) before repeating 801.

On the other hand, if $S_{measured} < S_{threshold}$, this means that the battery 182 should be replaced. Consequently, at 807, a battery replacement recommendation 181 can be generated. Then, at 809, the remote server 106 can notify the enterprise about the battery replacement recommendation 181. For example, the remote server 106 can send (or initiate the sending of) a message to the enterprise that includes the battery replacement recommendation 181.

In some embodiments, the battery status information 165 can include a metric that indicates how much capacity the battery 182 currently has relative to how much capacity the battery 182 had when it was new. This type of metric may be referred to as a percent capacity metric. As an example, if the percent capacity metric is 50%, then this means that the current capacity of the battery 182 is only 50% as much as it was when the battery 182 was new.

In some embodiments, the percent capacity metric can be used in a similar manner to $S_{measured}$ and $S_{threshold}$ in the method 800 shown in FIG. 8. For example, a threshold level can be defined for the percent capacity metric. When the value of the percent capacity metric drops below this threshold value, this can be interpreted as an indication that the battery 182 should be replaced. In response, a battery replacement recommendation 181 can be generated, and the remote server 106 can notify the enterprise about the battery replacement recommendation 181.

Reference is once again made to FIG. 1D. Once the data analysis results 146 have been generated, the remote server 106 can send feedback information 150 to an enterprise associated with the barcode-reading devices 110-1, 110-2. The feedback information 150 can be based at least in part on the data analysis results 146. FIG. 1D shows the remote server 106 with feedback instructions 148 stored in the memory 140. The feedback instructions 148 can be executable by the processor 138 to provide the feedback information 150 to the enterprise.

The feedback information 150 can include some or all of the data analysis results 146. More specifically, the feedback information 150 can include some or all of the license key count 152, the barcode quality information 154, and the device effectiveness information 156.

Figure 9A:
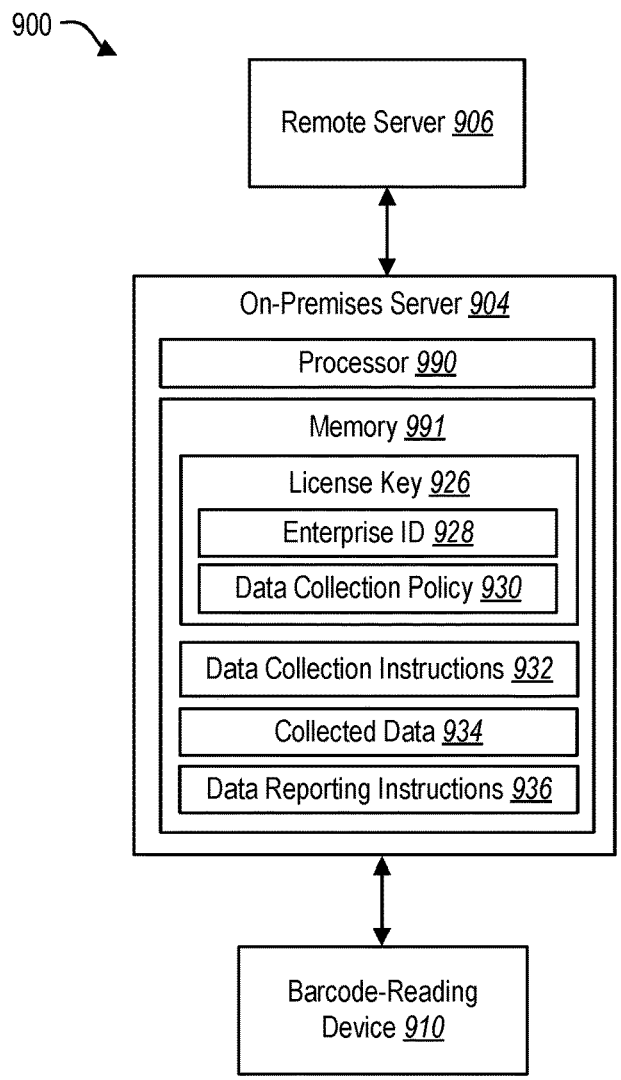
FIG. 9A illustrates another example of a system in which the techniques disclosed herein can be utilized.

FIG. 9A illustrates another example of a system 900 in which the techniques disclosed herein can be utilized. The system 900 includes a barcode-reading device 910 that is communicatively coupled to an on-premises server 904. The on-premises server 904 is communicatively coupled to a remote server 906. Communication between the on-premises server 904 and the remote server 906 can occur via the Internet.

In the system 100 described previously in connection with FIGS. 1A-D, the barcode-reading devices 110-1, 110-2 are configured to collect data 134 and report the collected data 134 to the remote server 106. In contrast, in the system 900 shown in FIG. 9A, it is the on-premises server 904 that is configured to collect data 934 and report the collected data 934 to the remote server 906. In other words, in the embodiment shown in FIG. 9A, the on-premises server 904 can be configured to perform the data collection functionality that was previously described as being performed by the barcode-reading devices 110-1, 110-2.

The on-premises server 904 includes a processor 990 and memory 991 that is communicatively coupled to the processor 990. The memory 991 includes various instructions that are executable by the processor 990, including data collection instructions 932 and data reporting instructions 936. The data collection instructions 932 are executable by the processor 990 to collect data 934 that is related to the operation of the barcode-reading device 910. The data reporting instructions 936 are executable by the processor 990 to send the collected data 934 to the remote server 906.

The on-premises server 904 includes a license key 926. The license key 926 is stored on the on-premises server 904 instead of the barcode-reading device 910. The license key 926 can otherwise be similar to the license key 126 described above in connection with the system 100 shown in FIG. 1A. For example, the license key 926 can include an enterprise ID 928 and a data collection policy 930.

The data collection instructions 932 can be executable by the processor 990 to activate or deactivate data collection based at least in part on the data collection policy 930. In the system 900 shown in FIG. 9A, it is the on-premises server 904 (instead of the barcode-reading device 910) that initiates and carries out data collection. Except for this difference, however, data collection can occur in a similar manner to the way that data collection was described above in connection with the system 100 shown in FIG. 1A.

Except for the data collection functionality, the barcode-reading device 910 can otherwise be configured similarly to the barcode-reading device 110 described previously, and the remote server 906 can otherwise be configured similarly to the remote server 106 described previously.

Figure 9B:
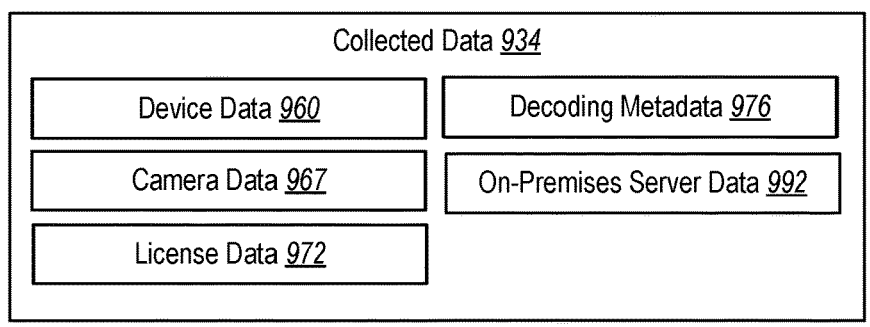
FIG. 9B illustrates an example of data that can be collected and reported to a remote server in the system shown in FIG. 9A.

FIG. 9B illustrates an example of data 934 that can be collected by the on-premises server 904 and reported to the remote server 906 in the system 900 shown in FIG. 9A. The data 934 that is collected for a particular barcode-reading device 910 can include device data 960, camera data 967, license data 972, and decoding metadata 976. The device data 960, camera data 967, license data 972, and decoding metadata 976 can be similar to the device data 160, camera data 167, license data 172, and decoding metadata 176, respectively, which were described previously in connection with the system 100 shown in FIG. 1A.

In addition to the device data 960, camera data 967, license data 972, and decoding metadata 976, the collected data 934 also includes on-premises server data 992. The on-premises server data 992 includes data about the characteristics of the on-premises server 904.

The on-premises server data 992 that is collected for a particular on-premises server 904 can describe one or more characteristics of the on-premises server 904. For example, the on-premises server data 992 that is collected for a particular on-premises server 904 can include a unique ID (e.g., a processor ID, a MAC address, a UUID), an operating system version, location information, and so forth.

At least some of the on-premises server data 992 (either alone or in combination with at least some device data 960) can be considered to be a device fingerprint. Such a device fingerprint can be used in any of the ways that were described above in connection with the device fingerprint 180.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read information from and/or write information to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system comprising:
a plurality of barcode-reading devices, each barcode-reading device comprising a camera that is configured to capture barcode images and a decoder that is configured to decode the barcode images and generate decoded data;
at least one processor;
data collection instructions executable by the at least one processor to collect data, the collected data being distinct from the decoded data;
data reporting instructions executable by the at least one processor to send the collected data to a remote server, wherein the remote server comprises a remote server processor;
data analysis instructions executable by the remote server processor to analyze the collected data and generate data analysis results; and
feedback instructions executable by the remote server processor to provide feedback information to an enterprise associated with the plurality of barcode-reading devices based at least in part on the data analysis results.

2. The system of claim 1, wherein:
a license key is needed to enable at least one feature of the decoder;
the license key comprises a data collection policy that indicates whether data collection should be activated or deactivated; and
the data collection instructions are additionally executable by the at least one processor to activate or deactivate the data collection based at least in part on the data collection policy.

3. The system of claim 2, wherein the data collection policy additionally specifies which data should be collected and when the data should be collected.

4. The system of claim 1, wherein:
a license key is needed to enable at least one feature of the decoder;
the data analysis instructions are executable by the remote server processor to analyze the collected data and generate a license key count, the license key count indicating how many license keys have been used by any barcode-reading devices associated with the enterprise during a particular time period; and
the feedback information comprises the license key count.

5. The system of claim 4, wherein generating the license key count for the enterprise comprises determining how many unique device fingerprints exist within a portion of the collected data that is associated with the enterprise and with the particular time period.

6. The system of claim 1, wherein:
the data analysis instructions are executable by the remote server processor to analyze the collected data and generate barcode quality information;
the barcode quality information that is determined in relation to a barcode-reading device indicates quality of printed barcodes that are being read by the barcode-reading device; and
the feedback information comprises the barcode quality information.

7. The system of claim 6, wherein generating the barcode quality information comprises determining that a decoding statistic associated with a barcode-reading device has changed by more than a threshold amount relative to a previous value.

8. The system of claim 1, wherein:
the data analysis instructions are executable by the remote server processor to analyze the collected data and generate device effectiveness information;
the device effectiveness information that is determined in relation to a barcode-reading device indicates how effectively that barcode-reading device is being used to read barcodes; and
the feedback information comprises the device effectiveness information.

9. The system of claim 8, wherein generating the device effectiveness information comprises determining that a decode statistic associated with a barcode-reading device is greater than or equal to a pre-defined maximum value.

10. The system of claim 1, wherein:
the data analysis instructions are executable by the remote server processor to analyze the collected data and generate a battery replacement recommendation for at least one barcode-reading device; and
the feedback information comprises the battery replacement recommendation.

11. The system of claim 1, wherein:
the system further comprises an on-premises server; and
the data reporting instructions are executable by the at least one processor to send the collected data to the remote server via the on-premises server.

12. The system of claim 1, wherein the data reporting instructions are executable by the at least one processor to send the collected data to the remote server via an Internet connection.

13. The system of claim 1, wherein the collected data comprises at least one of:
device data that describes one or more characteristics of the barcode-reading device;
camera data that describes one or more characteristics of the camera;
license data that describes one or more characteristics of a license key for the decoder; and
decoding metadata that describes one or more characteristics of the decoded data but does not include any of the decoded data.

14. A barcode-reading device comprising:
a camera configured to capture barcode images;
a processor and memory communicatively coupled to the processor;
a decoder that is stored in the memory and executable by the processor to decode the barcode images and generate decoded data;
a license key stored in the memory, the license key being configured to enable at least one feature of the decoder;
a data collection policy within the license key, wherein the data collection policy indicates whether data collection is activated or deactivated; and
instructions stored in the memory and executable by the processor to collect data and send the collected data to a remote server when the data collection policy indicates that data collection is activated.

15. The barcode-reading device of claim 14, wherein the collected data is distinct from the decoded data.

16. The barcode-reading device of claim 14, wherein the data collection policy additionally specifies which data should be collected and when the data should be collected.

17. The barcode-reading device of claim 14, wherein the collected data comprises at least one of:
device data that describes one or more characteristics of the barcode-reading device;
camera data that describes one or more characteristics of the camera;
license data that describes one or more characteristics of a license key for the decoder; and
decoding metadata that describes one or more characteristics of the decoded data but does not include any of the decoded data.

18. A method for generating a license key count for an enterprise, the license key count indicating how many barcode-reading devices within an enterprise have used a license key for a barcode decoder during a desired time period, the method being performed by a remote server, the method comprising:
receiving collected data from the barcode-reading devices;
filtering the collected data based on an enterprise identifier (ID) to exclude any data that does not correspond to the enterprise;
filtering the collected data based on a desired time period to exclude any data that does not correspond to the desired time period;
generating the license key count by determining how many unique device fingerprints remain in the filtered data; and
reporting the license key count to the enterprise.

19. The method of claim 18, further comprising:
analyzing the collected data to generate barcode quality information, wherein the barcode quality information that is determined in relation to a barcode-reading device indicates quality of printed barcodes that are being read by the barcode-reading device; and
reporting the barcode quality information to the enterprise.

20. The method of claim 18, further comprising:
analyzing the collected data to generate device effectiveness information, wherein the device effectiveness information that is determined in relation to a barcode-reading device indicates how effectively that barcode-reading device is being used to read barcodes; and
reporting the device effectiveness information to the enterprise, wherein the enterprise uses the device effectiveness information to determine that the barcode-reading device is not being used properly or that the barcode-reading device has at least one hardware issue.

* * * * *